United States Patent
Papadopoulos et al.

(10) Patent No.: US 8,787,259 B2
(45) Date of Patent: Jul. 22, 2014

(54) METHOD FOR EFFICIENT MU-MIMO TRANSMISSION BY JOINT ASSIGNMENTS OF TRANSMISSION ARCHITECTURE, AND INTERFERENCE ALIGNMENT SCHEMES USING OPTIMIZED USER-CODE ASSIGNMENTS AND POWER-ALLOCATION

(75) Inventors: Haralabos Papadopoulos, San Jose, CA (US); Sean A. Ramprashad, Los Altos, CA (US); Chenwei Wang, Irvine, CA (US)

(73) Assignee: NTT DoCoMo, Inc., Tokyo (JP)

( * ) Notice: Subject to any disclaimer, the term of this patent is extended or adjusted under 35 U.S.C. 154(b) by 524 days.

(21) Appl. No.: 13/239,167

(22) Filed: Sep. 21, 2011

(65) Prior Publication Data

US 2012/0069824 A1   Mar. 22, 2012

Related U.S. Application Data

(60) Provisional application No. 61/385,430, filed on Sep. 22, 2010.

(51) Int. Cl.
*H04W 4/00* (2009.01)
*H04B 7/08* (2006.01)
*H04B 7/04* (2006.01)
*H04B 7/02* (2006.01)

(52) U.S. Cl.
CPC ............ *H04B 7/0822* (2013.01); *H04B 7/0413* (2013.01); *H04B 7/024* (2013.01)
USPC .............................. 370/328; 370/436; 370/478

(58) Field of Classification Search
None
See application file for complete search history.

(56) References Cited

U.S. PATENT DOCUMENTS

| | | | | |
|---|---|---|---|---|
| 8,542,640 | B2 * | 9/2013 | Ramprashad et al. | 370/329 |
| 8,693,442 | B2 * | 4/2014 | Baligh et al. | 370/334 |
| 2008/0212550 | A1 * | 9/2008 | Han et al. | 370/342 |
| 2008/0240269 | A1 * | 10/2008 | Pajukoski et al. | 375/260 |
| 2010/0075687 | A1 | 3/2010 | Chayat | |
| 2010/0303034 | A1 * | 12/2010 | Chen et al. | 370/329 |
| 2010/0304773 | A1 * | 12/2010 | Ramprashad | 455/509 |
| 2011/0081875 | A1 * | 4/2011 | Imamura et al. | 455/101 |
| 2011/0081934 | A1 * | 4/2011 | Imamura et al. | 455/522 |
| 2011/0194593 | A1 * | 8/2011 | Geirhofer et al. | 375/224 |

OTHER PUBLICATIONS

PCT International Search Report for related PCT patent application No. PCT/US2011/052726, Dec. 2, 2011, 5 pgs.

(Continued)

*Primary Examiner* — Bob Phunkulh
(74) *Attorney, Agent, or Firm* — Blakely, Sokoloff, Taylor & Zafman LLP

(57) ABSTRACT

A method, apparatus, and wireless communication system is disclosed herein for operating a BIA code structure in a system. In one embodiment, the wireless communication system comprises a plurality of receivers, wherein each receiver in the plurality having a multi-mode antenna with a single radio frequency (RF) chain that is operable in a plurality of antenna modes, and further wherein each receiver shifts between the plurality of antenna modes in a predetermined manner. The wireless communication system also includes a plurality of base stations in a cell topology to perform downlink transmissions to the plurality of receivers, each base station in the plurality of base stations having one or more transmitters having a transmit antenna and being operable to communicate with one or more of receivers in the plurality of receivers using a multi-user MIMO (MU-MIMO)-based blind interference alignment (BIA) scheme, wherein each active base station in the plurality of base stations operates an identical BIA code structure in a given transmission resource.

24 Claims, 9 Drawing Sheets

(56) References Cited

OTHER PUBLICATIONS

PCT Written Opinion of the International Searching Authority for related PCT patent application No. PCT/US2011/052726, Dec. 2, 2011, 9 pgs.

Wang et al., "Aiming Perfectly in the Dark—Blind Interference Alignment through Staggered Antenna Switching", URL:http://arxiv.org/PS_cache/arxiv/pdf/1002/1002.2720v1.pdf.

Song et al., "Collaborative MIMO", IEEE 802.16 Broadband Wireless Access Working Group, URL:http://www.wirelessman.org/tgm/contrib/, Nov. 7, 2011.

Chenwei Wang et al: "Aiming Perfectly in the Dark—Blind Interference Alignment through Staggered Antenna Switching", arXiv—Computer Science, Information Theory, Feb. 15, 2010, 28 pages.

Yang Song et al: "Collaborative MIMO, IEEE C802.16m-07/244r1", Internet Citation, Nov. 7, 2007, 9 pages.

PCT Preliminary Report on Patentability for related PCT patent application No. PCT/US2011/052726, Apr. 4, 2013, 9 pages.

* cited by examiner

Base-Station *b*

| Time → | User Index | t=1 | t=2 | t=3 |
|---|---|---|---|---|
| Band F1 | k=1 | P1/2 | P1 | 0 |
|  | k=2 | P2/2 | 0 | P2 |
| Band F2 | k=1 | P2/2 | P2 | 0 |
|  | k=2 | P1/2 | 0 | P1 |

Base-Station *b*+1

| Time → | User Index | t=1 | t=2 | t=3 |
|---|---|---|---|---|
| Band F1 | k=1 | P2/2 | P2 | 0 |
|  | k=2 | P1/2 | 0 | P1 |
| Band F2 | k=1 | P1/2 | P1 | 0 |
|  | k=2 | P2/2 | 0 | P2 |

METHOD FOR EFFICIENT MU-MIMO TRANSMISSION BY JOINT ASSIGNMENTS OF TRANSMISSION ARCHITECTURE, AND INTERFERENCE ALIGNMENT SCHEMES USING OPTIMIZED USER-CODE ASSIGNMENTS AND POWER-ALLOCATION

PRIORITY

The present patent application claims priority to and incorporates by reference the corresponding provisional patent application Ser. No. 61/385,430, titled, "A Method for Efficient MU-MIMO Transmission by Joint Assignments of Transmission Architecture, and Interference Alignment Schemes Using Optimized User-Code Assignments and Power-Allocation," filed on Sep. 22, 2010.

FIELD OF THE INVENTION

Embodiments of the present invention relate to the field of multi-user Multiple Output Multiple Input (MIMO) wireless transmission systems; more particularly, embodiments of the present invention relate to a Blind Interference Alignment (BIA)-based Multi-User MIMO communication system in which each active base station operates an identical BIA code structure across the cell topology in a given transmission resource.

BACKGROUND OF THE INVENTION

Many recent advances in wireless transmission have rested on the use of multiple antennas for transmission and reception. Multiple antennas, fundamentally, can provide an increase in the numbers of Degrees of Freedom (DoFs) that can be exploited by a wireless system for transmission, i.e., the number of scalar data streams that can be simultaneously transmitted to the receiving parties in the system. DoFs can be used to provide increased spectral efficiency (throughput) and/or added diversity (robustness). Indeed, a Single User MIMO (SU-MIMO) system with $N_t$ transmission (TX) antennas serving a single user with $N_r$ receive (RX) antennas may be able to exploit up to $\min(N_t, N_r)$ DoFs for downlink transmission. These DOFs, for example, can under certain conditions be used to improve throughput by a factor that grows linearly with $\min(N_t, N_r)$. Such benefits of MIMO, and increased DoFs, underlie much of the interest in using MIMO in new and future systems.

Exploiting such DoFs often requires some amount of cost to the system. One such cost is knowledge of the channel state between transmitting and receiving antennas. Such Channel State Information (CSI) often has to be available to either the transmitter (such CSI is termed CSIT) and/or to the receiver (such CSI is termed CSIR). The DoFs available also depend on having sufficient "richness" in the channels between transmitting and receiving antennas. For example, SU-MIMO CSIR-based systems such as Bit Interleaved Coded Modulation (BICM) and D-BLAST can achieve the maximum possible DoFs of $\min(N_t, N_r)$ under suitable channel conditions. CSIT is not required. Under such conditions, they therefore can be used to provide corresponding linear increases in spectral efficiency. Such designs are well understood by those familiar with the state of the art.

Similarly, a Multi-User MIMO (MU-MIMO) system with $N_t$ transmission antennas at the base station (BS) and K single-antenna users ($N_r=1$) can provide up to $\min(N_t, K)$ DoFs. As in the case of SU-MIMO, MU-MIMO can, for example, be used to improve throughput linearly with $\min(N_t, K)$. However, unlike SU-MIMO, many MU-MIMO techniques (in fact most if not all of the prevailing MU-MIMO techniques used and studied for standards) require knowledge of CSIT. MU-MIMO based on CSIT, unlike SU-MIMO based on CSIR, requires additional overheads to estimate CSI and feedback CSI to transmitters before the transmission can take place.

Despite such overheads, MU-MIMO is of practical interest since it has the benefit over SU-MIMO of being able to grow the DoFs without having to add many receive antennas, radio frequency (RF) chains, or increase processing (e.g., decoding) complexity to portable or mobile devices.

The issue of CSI overhead has to be considered carefully. It is a fundamental issue often overlooked in assessing such conventional MIMO. Such CSI-related overheads in fact can represent a fundamental "dimensionality bottleneck" that can limit the net spectral efficiency increase that can be obtained with conventional CSI-dependent MIMO. In particular, if one wants to continue to exploit the growth in DoFs (e.g., linear growth) by increasing $N_t$ (or $N_r$, or K), one also has to consider how to support increased system overhead in obtaining the CSI required to formulate transmissions and decode at the receivers. Such overhead can include increased use of the wireless medium for pilots supporting CSI estimation and increased feedback between receiving and transmitting entities on such CSI estimates.

As an example, assume that for each complex scalar value that defines the CSI between a single TX antenna and a single RX antenna (this type of CSI is often termed direct CSI by some in the Standards community) a fixed percentage $F_{csi}$ of wireless-channel resources is dedicated to pilots and/or feedback. One can see that as the dimension of the CSI required scales with quantities like $N_t$, $N_r$ and/or K, the total CSI system-related overhead grows (e.g. by $N_t \times F_{csi}$). For example, for K single antenna users, each with $N_t$ CSI scalar terms with respect to the transmitting antenna, there are a total of $KN_t$ such complex scalar values that the transmitter may need to know. Supporting an increase in the dimension of the CSI can take more wireless-channel resources, and reduces the amount of resources left for data transmission. This overhead increase can limit continued growth in throughput if spectral efficiency improvements do not offset increased CSI overheads.

The value $F_{csi}$ is often defined either by the system or by necessity given the coherence of channels in time and/or frequency. As the state of channels changes more rapidly in time and/or frequency, a larger effective fraction of resources may need to be used to estimate and keep track of CSI.

As an example, in a Frequency Division Duplex (FDD) based 3GPP Long Term Evolution (LTE) design, 8 symbols in a resource block of 12×14 OFDM symbols are used to support downlink pilots for each of the $N_t$ antennas. Simply considering system overheads for such pilots, and ignoring other CSI related overheads such as feedback, $F_{csi}$ can be as large as 8/168=4.76%. It means that with $N_t=8$, assuming the pilot structure scales linearly with additional antennas, the total CSI-overhead could be as large as 38%, leaving 62% of symbols for supporting the remaining signaling overheads and data transmission. In fact, LTE has considered to change the pilot structure beyond $N_t=4$ antennas. However, this also has implications to CSI accuracy. Nonetheless, clearly, such a system would not support unbounded increases in $N_t$.

Thus, though symbols that represent coded data information are used more efficiently, with increased robustness and/or spectral efficiency due to the increased DoFs by MIMO, the net spectral efficiency increases have to account for the fraction of resources used for CSI overhead. Thus, the net spectral efficiency growth is in fact less than that of individual data symbols as only a fraction, e.g. no more than $(1-N_t \times F_{cst})$, of symbols can be used for data.

Recently a new class of techniques, termed "Blind Interference Alignment" (BIA) techniques, has demonstrated the ability to grow DoFs without requiring many of the CSI overheads of conventional MU-MIMO systems. It is possible for a BIA Multi-User MIMO (MU-MIMO) system with $N_t$ transmission antennas at the BS and K single active-antenna users to achieve $KN_t/(K+N_t-1)$ DoFs without CSIT. Thus, as K grows, the system can approach the CSI-dependent upper bound of $\min(N_t, K)$ DoFs that is achievable by conventional MU-MIMO CSIT-based systems. This is a striking result since it goes against much of the conventional thinking and conjectures over recent decades, and it provides the potential to relieve the "dimensionality bottleneck" being faced by current systems.

For such a system to work, there is a requirement that the channels seen between the transmitting BS and the K users being served must be jointly changing in a predetermined way (with respect to the blind interference alignment scheme). This joint variation can be accomplished by having multiple antenna modes. This can be implemented by employing many (physical) antenna elements at each user, or by having a single antenna element that can change its physical characteristic, e.g. orientation, sensitivity pattern, etc. However, in all such cases, the system requires only that one mode be active at a given time slot. Thus, it is sufficient to have only a single RF chain at each mobile, whereby the single active-receive antenna mode of a user i.e., the antenna driving the single RF chain of the user, can be varied over time. In other words, the single active receive antenna is a multi-mode antenna, able to switch between, e.g., $N_t$ modes in a pre-determined fashion. Having a single RF chain keeps decoding complexity in line with conventional single-antenna mode MU-MIMO systems.

The modes must be able to create independent (e.g., linearly independent) CSI vectors for the single user. Transmission also has to be confined to a suitable coherence interval in time over which the CSI in a given mode, though unknown to the system, is assumed to be effectively constant and different from mode to mode.

The BIA technique works by creating a suitable antenna mode switching and combined data transmission vector over the K information bearing streams that are to be sent to the K users (one stream carries the intended information for one user). Such information bearing stream themselves are vectors. These are sent in various arithmetic combinations simultaneously thus using the extra DoFs provided by the antenna mode switching.

The coordination of user receive-antenna switching modes and the way the information streams are sent by the BIA scheme is designed to maximize the DoFs by complying with the following principles:

any $N_t$ dimensional symbol intended for a given user is transmitted through $N_t$ slots;

during these $N_t$ slots, the antenna-switching pattern of that user ensures that the user observes that symbol through all its $N_t$ antenna modes (thereby in an $N_t$ dimensional space) and can thus decode it; and in contrast, the antenna-switch patterns of the rest of the users are such that the transmission of this $N_t$ dimensional symbol only casts an 1-dimensional shadow to their receivers. This is accomplished by ensuring that each of these receivers uses the same antenna mode in all the $N_t$ dimensional symbol is transmitted.

Thus, a total of $(N_t+K-1)$ receiver dimensions are needed per user to decode $N_t$ scalar symbols. As a result, with this scheme, K users decode a total of $KN_t$ symbols ($N_t$ each) per $(N_t+K-1)$ channel uses, thereby achieving the maximum possible BIA DoF of $KN_t/(N_t+K-1)$.

BIA techniques do have some inherent challenges and limitations in the scenarios in which they can be used. The first inherent problem is that BIA schemes often require high Signal to Noise Ratios (SNRs) to operate effectively, e.g. the original BIA scheme may require up to 20 dB of SNR. This is due to a property of the interference alignment process, which results in noise being amplified in the resulting interference-aligned streams. As a consequence of this, the original BIA technique has limited application to many users in a cellular environment. For example, cell-edge users in conventional cellular often experience Signal-to-Interference-plus-Noise-Ratios (SINRs) on the order of 0 dB or less, due to the interference coming from interfering cells not serving the K users, thus making it for the purpose of analysis effectively noise. Many users, not just cell-edge users, do not have SINRs on the order of 20 dB or more. Unfortunately, it is often the lower SNR users that are often the ones that need techniques to help them boost their spectral efficiency and DOFs. The BIA scheme therefore requires modification and a proper deployment setup to enable it to be useful to many users in a cellular environment.

SUMMARY OF THE INVENTION

A method, apparatus, and wireless communication system is disclosed herein for operating a BIA code structure in a system. In one embodiment, the wireless communication system comprises a plurality of receivers, wherein each receiver in the plurality having a multi-mode antenna with a single radio frequency (RF) chain that is operable in a plurality of antenna modes, and further wherein each receiver shifts between the plurality of antenna modes in a predetermined manner. The wireless communication system also includes a plurality of base stations in a cell topology to perform downlink transmissions to the plurality of receivers, each base station in the plurality of base stations having one or more transmitters having a transmit antenna and being operable to communicate with one or more of receivers in the plurality of receivers using a multi-user MIMO (MU-MIMO)-based blind interference alignment (BIA) scheme, wherein each active base station in the plurality of base stations operates an identical BIA code structure in a given transmission resource.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
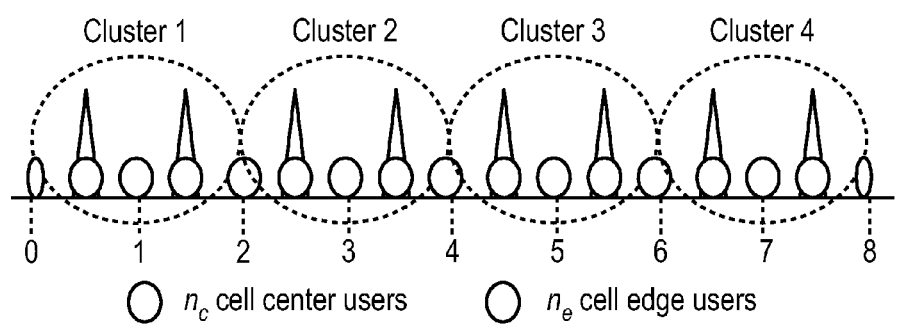
FIG. 1A illustrates a 1-dimensional illustration of a cluster transmission strategy indicating locations of stations (triangles), locations of cell-center and cell-edge users (solid ovals), and clusters for a cluster size of 2 base-stations (dashed ovals).

Embodiments of the present invention relate to a class of techniques known as Blind Interference Alignment (BIA) that can be used to support Multi-User MIMO transmission. In such a system multiple users, each having a few receive antenna elements are able to simultaneously receive multiple data streams (at least one intended for each user) over the same transmission resource. The BIA techniques allow transmission and alignment of interference between the streams to be done without the transmitter needing to know the instantaneous channel state information (CSI) between transmitter and receiver.

One aspect of embodiments of the invention focuses on adjusting the power allocations across users, across alignment blocks, across transmit antennas, and across clusters of antennas performing simultaneous transmission of parallel BIA processes to further improve system performance. Another aspect of embodiments of the invention focuses on jointly varying these power allocations together with the transmission architecture across clusters and the groups of users jointly scheduled for transmission across the multisite deployments.

In summary, embodiments of the invention include techniques for coordinating groups of users within a cluster that are scheduled for joint multiuser BIA transmission, as well as the individual code assignments of users within the BIA scheme and the associated transmit power allocations throughout the alignment scheme. Another aspect of embodiments of the invention includes coordinated assignments of scheduling groups, BIA codes, and user power allocations across clusters of stations. These assignments control the distribution of user SINRs across deployments and can be tailored and optimized in a semi-static fashion to optimize system performance.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Embodiments of the invention include techniques for coordinated BIA transmissions across cellular and beyond-cellular networks. One or more of these techniques enable improved system-wide performance by coordinating transmissions initiated by distinct clusters of base-stations.

In one embodiment, parallel synchronous BIA schemes are deployed across clusters, and embodiments of the invention coordinate any subset of the following: a method based on which sets of users are scheduled for parallel BIA transmission across clusters; a re-assignment method of each of the BIA codes across clusters to cluster-users; a power allocated to the user streams on each of the BIA codes from each base-station in the cluster; and a way the power allocated to the user streams on a fixed BIA coding structure is varied across clusters.

The above processes of coordination of the BIA scheme assignments across clusters allow the user SINRs to be systematically controlled in order to optimize system or user specific performance metrics. This provides significant benefits over existing BIA scheme that do not employ combinations of the above methods.

In order to explain the coordination methods presented herein, the original BIA scheme is discussed initially followed by a description of extensions that correspond to power variations of the original scheme, which preserve the "blind interference alignment" properties of the original scheme. These techniques can provide system performance advantages in the context of parallel BIA transmissions across clusters, by exploiting coordinated user-BIA code reassignments from cluster to cluster together with power allocations as described below.

The Original BIA Scheme

Figure 10:
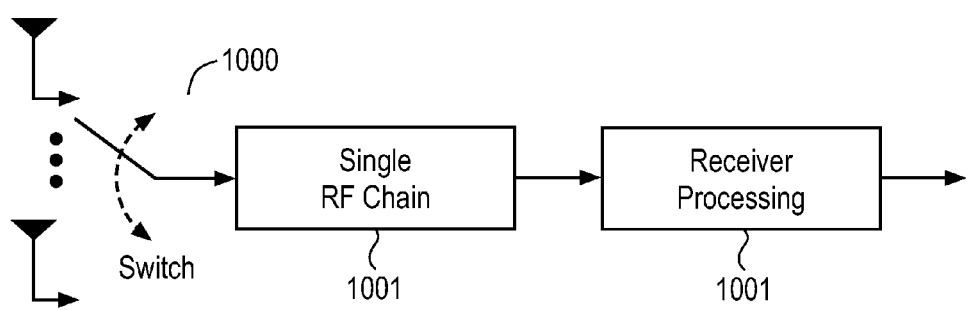
FIG. 10 illustrates a multi-mode antenna receiver.

The original BIA scheme well-known by those skilled in the art. For information, see C. Wang, et al, "Aiming Perfectly in the Dark—Blind Interference Alignment through Staggered Antenna Switching", February 2010, (hereinafter "Wang"). The original BIA scheme describes a method for simultaneously communicating information bearing signals to K receivers from a set of M transmit antennas. Each receiver has M physical antennas, but only a single RF chain. An example of one such receiver is shown in FIG. 10 where single RF chain 1001 switches between various antenna 1000 and interfaces antennas 1000 with receiver processing 1002. As a result of having only a single RF chain, effectively $N_r=1$ and only one receive antenna (one receive antenna mode) can be active (i.e., can be receiving transmissions) in a given time slot. As a result only one receive antenna can be active (i.e., can be receiving data) in a given slot (e.g., time-frequency slot in an OFDM transmission). For the purposes of exposition, it is assumed that the (average) transmit power per time-frequency slot in the system is "$P_{slot}$". The BIA(M,K) schemes presented in Wang transmit from a set of M antennas (which, and in particular for the purposes of embodiments of this invention and not necessarily in the original scheme, can reside over one or more BSs) an average of $M/(M+K-1)$ coded symbols to each of K users. This is the maximum for any such alignment scheme (in the absence of CSIT) and it is achieved by:

- cycling through the receive antennas at each user terminal in a jointly coordinated manner
- systematically transmitting all the user symbols through the M antennas, such that
  - each user can pick out measurements only containing its own symbols (in noise but with no interference from other user symbols), and
  - at each receiver interfering transmissions are aligned in the minimum possible number of dimensions, and the number of these "wasted" dimensions for such interference alignment is the smallest possible.

Specifically, the scheme transmits to each user a set of M-dimensional vector symbols (or symbol streams). Transmitting a single M-dimensional symbol over the M antennas means that the kth entry of the vector is transmitted over the kth antenna, for $k=1,2,\ldots,M$. A single BIA alignment block in Wang uses a total of "L" slots to deliver to each user k ($k=1,2,\ldots,K$) a set of "N" vector symbols $s_1^{[k]}$, $s_2^{[k]},\ldots,s_N^{[k]}$. The values of "N" and "L" are systematically determined in Wang and satisfy, $$L=N(M+K-1).$$

Thus, the average number of symbols provided by the alignment method to each user within the length-L alignment block is given by $$M\frac{N}{L} = \frac{M}{M+K-1}.$$

According to the original BIA method in Wang, the BIA alignment block of length L comprises two sub-blocks that are referred to herein as alignment blocks 1 and 2.

Alignment block 1: Block 1 has length $N(M-1)$. In each slot of alignment block 1, the transmitter transmits the sum of K vector symbols, one M-dimensional symbol per user. Which symbol (out of the N symbols) that is transmitted for each user is selected in a systematic way to ensure that all symbols are decodable at each user. Examples will illustrate this point.

Alignment block 2: Block 2 has length NK. In each slot of alignment block 2, the transmitter transmits only a single M dimensional symbol. In particular, the transmitter uses N slots in alignment block 2 per user to transmit each of the N user symbols one at a time, and it does so for each of the K users.

In order to ensure that each user can decode its own symbol stream, each user has to cycle through its set of M antenna modes in a predetermined and user-specific manner. In particular, let $h_m^{[k]}$ denote the 1×M channel vector between the M transmit antennas and the m-th receive antenna mode of the k-th user (where the m-th antenna mode of a user corresponds, for example, to activating the m-th receive antenna for that user). Let also $a^{[k]}(t)$ denote the index of the antenna mode selected by user k in slot t for $t=1, 2, \ldots, L$. Then the following 1×L vector captures the sequence of modes cycled by user k within a given alignment block:

$$a^{[k]}=[a^{[k]}(1)\,a^{[k]}(2)\ldots a^{[k]}(L)]$$

Below representative examples of coordinated symbol-user transmissions based on the original BIA scheme presented in Wang are provided. The extensions of these schemes that are of use in embodiments of the invention are presented thereafter.

Example 1

Original BIA Scheme with M=2, K=2

In this case the alignment code has length L=3. It delivers to each user a single 2 dimensional symbol, i.e., N=1. Letting $s^{[k]}$ denote the 2×1 coded symbol for users k, for k=1 and 2, and x(t) denote the transmitted symbol at slot t, the code is as follows:

$$[x(1) = s^{[1]} + s^{[2]}] \leftarrow \text{Block 1}$$

$$\begin{bmatrix} x(2) = s^{[1]} \\ x(3) = \phantom{s^{[1]}} s^{[2]} \end{bmatrix} \leftarrow \text{Block 2}$$

$$a^{[1]} = [1\ 2\ 1],\ a^{[2]} = [1\ 1\ 2]$$

Here, a stream $s^{[k]}$ is a vector of two dimensions of the form $$s^{[k]} = \begin{bmatrix} u_1^{[k]} \\ u_2^{[k]} \end{bmatrix}$$

where $u_i^{[k]}$ is the $i^{th}$ information bearing stream supporting data intended for user k.

Recall that each "symbol" can refer to a single numerical value, or can signify a block of such symbols. For simplicity in exposition herein the word "symbol" is used to refer to either case.

In order to facilitate interference alignment and decoding at each of the two receivers, the antenna modes are switched at each receiver according to $$a^{[1]}=[1\ 2\ 1], a^{[2]}=[1\ 1\ 2] \quad \text{(equation 2)}$$

This means that user k=1 uses its modes 1, 2 and 1 for blocks 1, 2, and 3 respectively. If one considers the receive signal at user k=1 with such mode switching, it has the following form:

$$r = \begin{bmatrix} r^{[1]}(1) \\ r^{[1]}(2) \\ r^{[1]}(3) \end{bmatrix} \quad \text{(equation 3)}$$

$$= \begin{bmatrix} h^{[1]}(1) & 0 & 0 \\ 0 & h^{[1]}(2) & 0 \\ 0 & 0 & h^{[1]}(1) \end{bmatrix} \begin{bmatrix} x(1) \\ x(2) \\ x(3) \end{bmatrix} + \begin{bmatrix} z^{[1]}(1) \\ z^{[1]}(2) \\ z^{[1]}(3) \end{bmatrix}$$

Here $z^{[k]}(t)$ is the additive noise of user k at slot t. Also note that given the antenna mode switching of user 1 defined by the scheme, and assuming all transmission happen within the a coherence interval in time and frequency, it follows that $h^{[1]}(1) = h^{[1]}(3)$ in equation 3.

Decoding: Consider first user 1. Because user 1 uses the same antenna mode in slots 1 and 3 (i.e., mode 1, since $a^{[1]}(1)=a^{[1]}(3)=1$), subtracting the received version of slot-3 transmission from the received version of the slot-1 transmission eliminates interference from $s^{[2]}$.

The result is $$y^{[1]} = \begin{bmatrix} r^{[1]}(1) - r^{[1]}(3) \\ r^{[1]}(2) \end{bmatrix} \quad \text{(equation 4)}$$

$$= \begin{bmatrix} h^{[1]}(1) \\ h^{[1]}(2) \end{bmatrix} \begin{bmatrix} u_1^{[1]} \\ u_2^{[1]} \end{bmatrix} + \begin{bmatrix} z^{[1]}(1) - z^{[1]}(3) \\ z^{[1]}(2) \end{bmatrix}$$

Similarly, consider next user 2. Because user 2 uses the same antenna mode in slots 1 and 2 (i.e., mode 1, since $a^{[2]}(1)=a^{[2]}(2)=1$), subtracting the received version of slot-2 transmission from the received version of the slot-1 transmission eliminates interference from $s^{[1]}$.

Thus, in a general form, after interference elimination, receiver k (for k=1 and 2) has a measurement signal of the form:

$$y^{[k]} = \begin{bmatrix} h_1^{[k]} \\ h_2^{[k]} \end{bmatrix} s^{[k]} + \begin{bmatrix} z_1^{[k]} \\ z_2^{[k]} \end{bmatrix} \quad \text{(equation 5)}$$

whereby the $z_m^{[k]}$ represents noise.

Note that, in each case, $z_1^{[k]}$ represents the sum of two noise terms (that from slots 1 and 3 for user one and slots 1 and 2 for user two). Thus, due to the interference cancellation, the power of $z_1^{[k]}$ is twice as large as $z_2^{[k]}$. This "increase in the noise power" effect is often referred to as noise-enhancement.

Example 2

Original BIA Scheme with M=2, Arbitrary K

In this case, the alignment code has length L=K+1. It delivers to each user a single 2 dimensional symbol, i.e., N=1. Letting $s^{[k]}$ denote the 2×1 coded symbol for user k, and x(t) denote the transmitted symbol at slot t, the code is as follows:

$$[x(1) = s^{[1]} + s^{[2]} + \ldots + s^{[K]}] \leftarrow \text{Block 1}$$

$$\begin{bmatrix} x(2) = s^{[1]} & & \\ x(3) = & s^{[2]} & \\ \vdots & & \ddots \\ x(K+1) = & & s^{[K]} \end{bmatrix} \leftarrow \text{Block 2}$$

$$a^{[1]} = [1\ 2\ 1\ \ldots]$$
$$a^{[2]} = [1\ 1\ 2\ \ldots]$$
$$\vdots \quad \ddots \ddots$$
$$a^{[K]} = [1\ \ldots\ 1\ 2]$$

Decoding: Consider user k for some k, 1≤k≤K. Because user k uses the same antenna mode in all slots except slot k, subtracting from the received slot-1 signal the sum of the received signals on all slots from slot 2 to slot K+1 and excluding slot k+1, eliminates interference from the symbols of all other users. After interference elimination, receiver k (for k=1, 2, . . . , K) has a measurement signal of the form:

$$y^{[k]} = \begin{bmatrix} h_1^{[k]} \\ h_2^{[k]} \end{bmatrix} s^{[k]} + \begin{bmatrix} z_1^{[k]} \\ z_2^{[k]} \end{bmatrix}$$

whereby the $z_m^{[k]}$ represents noise. Note that, in each case, $z_1^{[k]}$ represents the sum of K noise terms. This noise-enhancement effect is again due to the interference cancellation and more pronounced when K is larger, i.e., when more users are served, as the power of $z_1^{[k]}$ is K times as large as $z_2^{[k]}$.

Example 3

Original BIA Scheme with M=3, K=2

In this case, the alignment code in [1] delivers to each of the two users 2 3-dimensional symbols, i.e., user k gets $s^{[k]}$ for n=1,2 (and N=2). The code has length L=N(M+K−1)=8. Letting x(t) denote the transmitted symbol at slot t, the code is as follows:

$$\begin{bmatrix} x(1) = s^{[1]} & & +s_1^{[2]} \\ x(2) = & s_2^{[1]} & +s_1^{[2]} \\ x(3) = s_1^{[1]} & & +s_2^{[2]} \\ x(4) = & s_2^{[1]} & +s_2^{[2]} \end{bmatrix} \leftarrow \text{Block 1}$$

-continued $$\begin{bmatrix} x(5) = s_1^{[1]} & & \\ x(6) = & s_2^{[1]} & \\ x(7) = & & s_1^{[2]} \\ x(8) = & & s_2^{[2]} \end{bmatrix} \leftarrow \text{Block 2}$$

$a^{[1]} = [1\ 1\ 2\ 2\ 3\ 3\ 1\ 2]$ $a^{[2]} = [1\ 2\ 1\ 2\ 1\ 2\ 3\ 3]$

Decoding: Regarding receiver k (for k=1, 2) and symbol n (n=1, 2), it can be verified that after proper interference elimination, receiver k has a measurement signal of the form:

$$y_n^{[k]} = \begin{bmatrix} h_1^{[k]} \\ h_2^{[k]} \\ h_3^{[k]} \end{bmatrix} s_n^{[k]} + \begin{bmatrix} z_{n,1}^{[k]} \\ z_{n,2}^{[k]} \\ z_{n,3}^{[k]} \end{bmatrix}$$

whereby the $z_{n,m}^{[k]}$ represents noise. Due to the interference cancellation the power of $z_{n,m}^{[k]}$ for m<3 is twice as large as $z_{n,3}^{[k]}$.

Generalizations of the above BIA codes for the general M, K cases are given in Wang. After interference elimination, receiver k has a measurement signal of the form:

$$y_n^{[k]} = \begin{bmatrix} h_1^{[k]} \\ h_2^{[k]} \\ \vdots \\ h_M^{[k]} \end{bmatrix} s_n^{[k]} + \begin{bmatrix} z_{n,1}^{[k]} \\ z_{n,2}^{[k]} \\ \vdots \\ z_{n,M}^{[k]} \end{bmatrix}$$

whereby, due to the interference cancellation, the power of $z_{n,m}^{[k]}$ for m<M is K times as large as that of $z_{n,m}^{[k]}$.

BIA Scheme Nomenclature

For purposes herein, BIA $(M,K,\{p^{[k]},q^{[k]}\}_{k=1}^K)$ denotes the BIA scheme that arises as a power variation of the original BIA scheme described in Wang, according to which:

the power of the k-th user's stream transmitted from the j-th antenna in alignment block 2 is given by the j-th entry of $p^{[k]}$.

the power of the k-th user's stream transmitted from the j-th antenna in alignment block 1 is given by the product of $q^{[k]}$ and the j-th entry of $p^{[k]}$.

In this nomenclature, the original BIA scheme in Wang is referred to as BIA$(M,K,\{p1_{M\times 1},1\}_{k=1}^K)$, where $$p = \frac{M+K-1}{KM^2} P_{slot}.$$

Similarly, the constant transmission-power scheme arising from the equal alignment-block power BIA scheme is referred to as $$BIA\left(M, K, \left\{p1_{M\times 1}, \frac{1}{K}\right\}_{k=1}^K\right),$$

where $p=P_{slot}/M$.

The preceding constant transmission-power scheme is a special case of constant transmission-power BIA schemes of the form BIA$(M,K,\{p1_{M\times 1},q^{[k]}\}_{k=1}^K)$, whereby $$\sum_{k=1}^K q^{[k]} = 1,$$

and where $p=P_{slot}/M$.

Note also that, implicit to a BIA$(M,K,\{p^{[k]},q^{[k]}\}_{k=1}^K)$ scheme is the use of the associated antenna-cycling mode vector $a^{[k]}$ by user k, defining the precise pattern of antenna mode combinations that the BIA scheme requires each user k to cycle its antennas, in order to be able to cancel interference from all other users symbols and decode its own user streams.

In embodiments of the invention, the statement

"User X is assigned the m-th code in BIA$(M,K,\{p^{[k]}, q^{[k]}\}_{k=1}^K)$" is used to as a shorthand.

User X is the m-th user in the BIA$(M,K,\{p1_{M\times 1},q^{[k]}\}_{k=1}^K)$ scheme. In alignment block 2, the BIA scheme transmits the M symbol-streams destined for user X using powers given by $p^{[m]}$, while in block 1 it transmits the same streams at power levels given by the product of $p^{[m]}$ and $q^{[m]}$. In the meantime, user X uses the antenna-cycling mode pattern $a^{[m]}$.

Note that any scheme of the form BIA$(M,K,\{p^{[k]}, q^{[k]}\}_{k=1}^K)$ uses effectively the same alignment strategy as the original scheme in Wang, except for the transmit power variations. For instance, the user that is assigned the m-th code of BIA$(M,K,\{p^{[k]},q^{[k]}\}_{k=1}^K)$ uses the same antenna-cycling pattern $a^{[m]}$ as the user of the original BIA$(M,K,\{p1_{M\times 1},1\}_{k=1}^K)$ scheme. However, the interference cancellation algorithm at each user is in general different as it depends on the set $\{q^{[k]}\}$. The interference cancellation algorithm at each user however is the same for two BIA schemes that differ in their $\{p^{[k]}\}$ allocation but have the same $q^{[k]}$'s.

Embodiments Involving BIA Schemes Using Inter-Alignment Block Power Variations

Power allocation variations described herein may be presented using examples. These power allocation examples have two components. The first component relates to the relative power ratio between the power allocated to a user's scalar stream in alignment block 1 and that in alignment block 2. Specifically, in all the examples presented with respect to the original BIA scheme from Wang, the interference cancellation properties of the BIA scheme are preserved if:

each symbol of the form $s_n^{[k]}$ in alignment block 1 is replaced with $d^{[k]}s_n^{[k]}$ where $d^{[k]} \geq 0$ is a possibly user-specific scalar. Thus, scaling does not prevent one from performing alignment.

For convenience, this variation is parameterized in terms of the scalar $q^{[k]}$, which is the square of $d^{[k]}$, and denotes the ratio of the transmit power in block 1 of the kth user's stream on any antenna divided by the power of the same user/antenna stream in block 2.

Note that in the case of [1], $q^{[k]}=1$, implying that the transmit power of each user's symbol in block 2 is the same as in block 1. Another important case corresponds to the following "equal power" schemes.

As an example the equal alignment-block power BIA scheme from M=2 and arbitrary K is the following variation of the scheme in Example 2:

Example 4

BIA with Equalized Alignment-Block Power, with M=2, Arbitrary K

In this case, the alignment code has length L=K+1. It delivers to each user a single 2 dimensional symbol, i.e., N=1. Letting ski denote the 2×1 coded symbol for user k, and x(t) denote the transmitted symbol at slot t, the code is as follows:

$$\left[ x(1) = \frac{1}{\sqrt{K}} s^{[1]} + \frac{1}{\sqrt{K}} s^{[2]} + \ldots + \frac{1}{\sqrt{K}} s^{[K]} \right] \leftarrow \text{Block 1}$$

$$\begin{bmatrix} x(2) = & s^{[1]} & \\ x(3) = & & s^{[2]} \\ \vdots & & \ddots \\ x(K+1) = & & & s^{[K]} \end{bmatrix} \leftarrow \text{Block 2}$$

$$a^{[1]} = [1\ 2\ 1\ \ldots]$$
$$a^{[2]} = [1\ 1\ 2\ \ldots]$$
$$\vdots \quad \ddots \ddots$$
$$a^{[K]} = [1\ \ldots\ 1\ 2]$$

Decoding: Consider user k. Because user k uses the same antenna mode in all slots except slot k, subtracting from the first received-slot signal the signal that is $$\frac{1}{\sqrt{K}}$$

times the sum of the received signals on all slots from slot 2 to slot K+1 and excluding slot k+1, eliminates interference from the symbols of all other users. After interference elimination, receiver k (for k=1, 2, ..., K) has a measurement signal of the form:

$$y^{[k]} = \begin{bmatrix} h_1^{[k]} \\ h_2^{[k]} \end{bmatrix} s^{[k]} + \begin{bmatrix} z_1^{[k]} \\ z_2^{[k]} \end{bmatrix}$$

where $z_m^{[k]}$ represents noise. Note that in each case $z_1^{[k]}$ represents the sum of K noise terms. Thus, due to the interference cancellation, the power of the noise terms are still not equal, in particular, the power of $z_1^{[k]}$ is 2K−1 times as large as $z_2^{[k]}$, $z_2^{[k]}$, or, equivalently, the power of $z_2^{[k]}$ is 1/(2K−1) times that of $z_2^{[k]}$.

The case $q^{[k]}=1/K$ is a special case of broader class of BIA schemes that are exploited by the methods described herein, and all satisfy $$\sum_{k=1}^{K} q^{[k]} = 1.$$

When all user symbol streams have equal power, all such BIA schemes give rise to a constant power transmission scheme. The BIA schemes that arise in such a generalization of the scheme in Example 4 are given in the following example:

Example 5

BIA with Equalized Alignment-Block Power, with M=2, Arbitrary K

In this case, the alignment code has length L=K+1. It delivers to each user a single 2 dimensional symbol, i.e., N=1. Letting $s^{[k]}$ denote the 2×1 coded symbol for user k, and x(t) denote the transmitted symbol at slot t, the code is as follows:

$$\left[ x(1) = \sqrt{q^{[1]}} s^{[1]} + \sqrt{q^{[2]}} s^{[2]} + \ldots + \sqrt{q^{[K]}} s^{[K]} \right] \leftarrow \text{Block 1}$$

$$\begin{bmatrix} x(2) = & s^{[1]} & \\ x(3) = & & s^{[2]} \\ \vdots & & \ddots \\ x(K+1) = & & & s^{[K]} \end{bmatrix} \leftarrow \text{Block 2}$$

$$a^{[1]} = [1\ 2\ 1\ \ldots]$$
$$a^{[2]} = [1\ 1\ 2\ \ldots]$$
$$\vdots \quad \ddots \ddots$$
$$a^{[K]} = [1\ \ldots\ 1\ 2]$$

where $\sum_{k=1}^{K} q^{[k]} = 1.$

Decoding: Consider user k. Because user k uses the same antenna mode in all slots except slot k, subtracting from the first received-slot signal the sum of appropriately scaled versions of the received signals on all slots from slot 2 to slot K+1 and excluding slot k+1, interference can be eliminated from the symbols of all other users. After interference elimination, receiver k (for k=1, 2, ..., K) has a measurement signal of the form:

$$y^{[k]} = \begin{bmatrix} h_1^{[k]} \\ h_2^{[k]} \end{bmatrix} s^{[k]} + \begin{bmatrix} z_1^{[k]} \\ z_2^{[k]} \end{bmatrix}$$

where $z_m^{[k]}$ represents noise. Note that in each case $z_1^{[k]}$ represents the sum of K noise terms. Due to the interference cancellation, the power of $z_1^{[k]}$ is $$\frac{2 - q^{[k]}}{q^{[k]}}$$

times as large as that of $z_2^{[k]}$. Such schemes can yield improved rates over the original BIA scheme.

Exploiting User-Power Variations in the BIA Scheme

A second (and complimentary) class of power variation enhancements to the BIA schemes in Wang are in the form of varying the powers allocated to the k-th user symbols on each antenna in block 2. Specifically, $p^{[k]}$ is denoted an M×1 vector of power levels, whose j-th entry represents the transmit power (in alignment block 2) of the (scalar) symbol stream of user k that is transmitted from the j-th transmit antenna in the cluster. In Wang, all user symbols are transmitted at equal power, i.e., $p^{[k]} = p1_{M \times 1}$, where $$p = \frac{M+K-1}{KM^2} P_{slot}$$

and where $1_{M\times 1}$ is a M×1 vector of ones, and $P_{slot}$, represents the per-channel transmit power constraint (on the totality of the transmit antennas implementing the BIA scheme).

If instead, an equal alignment-block power BIA scheme is employed, and with equal-power allocation to all user streams, a scheme is obtained where the transmit power in each slot is exactly $P_{slot}$. In particular, $p^{[k]}=p1_{M\times 1}$, where $$p = \frac{1}{M} P_{slot}$$

Certainly, however, such an equal allocation to users is not necessarily optimal, especially when users see different SNRs.

Thus, and in particular, a special case of a variable-power BIA scheme that has advantages is in the case the BIA scheme employs transmission from multiple base-stations (or, more precisely from antennas that are not collocated. In the case transmission is emanating from two base-stations (antennas at two locations), it can be advantageous to have two different powers allocated to symbols transmitted from antennas at different base-stations (locations), i.e., it may advantageous to employ $p^{[k]}=p1_{M\times 1}$ of the form $$p^{[k]} = \begin{bmatrix} p_1^{[k]} 1_{M'\times 1} \\ p_2^{[k]} 1_{M'\times 1} \end{bmatrix}.$$

with M' denoting the antennas at each base station (or the subset of antennas utilized by the BIA scheme at each base station) and where 2M'=M. Such unequal power allocations, for example, are attractive when serving near "center" cell users, i.e., users in the proximity of one of the base-stations, as depicted by the cyan ovals under each BS in FIG. 2. In that case, placing most of the power on the user symbols transmitted from the nearby station improves the user's rates without affecting the rates of the other users in the alignment scheme. In contrast, cell-edge users that happen to be at the exact center of each two-BS cluster shown in FIG. 1, would in general be served with equal transmit power from each BS, i.e., for these users, $p_1^{[k]}=p_2^{[k]}$.

Users that are neither center nor edge users, but which are closer to one station would have $p_1^{[k]}\neq p_2^{[k]}$.

In a scenario where multiple users, from multiple locations in a cluster, are served simultaneously, in general, $p^{[k]}$ is optimized and not necessarily the same from user to user.

Cellular Using Aligned Code Structures

In one embodiment, a synchronous aligned BIA code structure is used across an extended cellular topology. For simplicity of explanation, a 1D wrapped cellular model as shown in FIG. 1B is used.

Figure 1B:
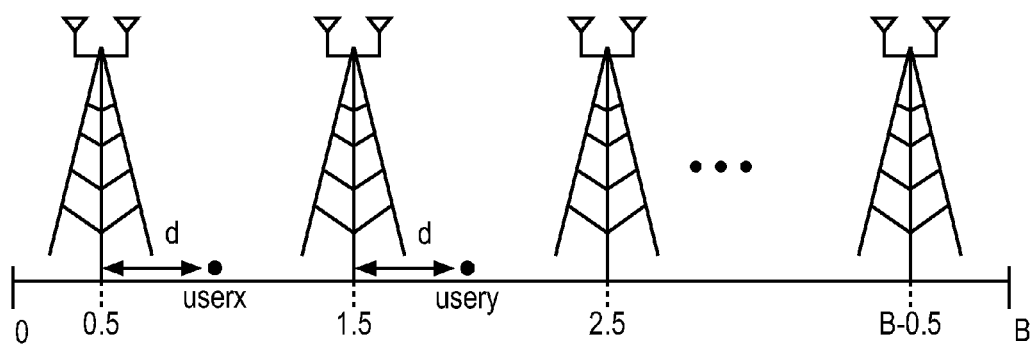
FIG. 1B illustrates one embodiment of a cell-based network.

Referring to FIG. 1B, the topology is normalized to an interval [0, B), with B=8 cells and cell b spanning the region [b, b+1) for b=0, . . . , 7. In cell b, there is one $N_t$-antenna BS located at b+0:5. In order to eliminate boundary effects, it is assumed a wrapped topology so that the distance between points $x_1, x_2 \in [0, B)$ in the wrapped topology distance is the minimum of $|x_1-x_2|$ and $B-|x_1-x_2|$. It is assumed that a path loss model of the following form is used:

$$g(d) = G_0 s^{\mathcal{K}}/(s^{\mathcal{K}}+d^{\mathcal{K}})$$

where d>0 is the distance between the user and its anchor BS, $\mathcal{K}$ is the propagation exponent, and s is the 3 dB breakpoint distance. The constant $G_0$ sets the transmit power at each BS and implicitly the received SNR. For the transmission in each slot in each cell, it is assumed that constant power transmission is employed.

Code-Reuse and Frequency-Reuse in Aligned BIA

There are a number of deployment options of aligned BIA code structures disclosed below. In these systems, transmission resources are divided into time "slots" and/or frequency "bands", as in an OFDM system. However, it should be clear that similar concepts can apply in other systems with orthogonal resources split in other ways.

In a given resource, e.g. a frequency band, a single (M, K) code-structure (with $M\leq N_t$) operates across the cellular deployment. In one embodiment, every active cell on a band operates the same (M, K) BIA code structure synchronously with all the other cells (say within the cyclic prefix constraints of an OFDM design), and each user performs the required alignment operation with respect to this (M, K) structure. Thus, the $k^{th}$ BIA-code is aligned across the cellular topology (for k=1, . . . , K).

The result of the aligned operation is that, after zero-forcing intra-cell interference in its receiver, a user obtains effectively a M×M SU-MIMO channel. With the aligned system, transmissions from all cells using different BIA-codes (different k) do not interfere. However, transmissions from different cells using the same code k do interfere. The system can therefore be modeled effectively as a system divided into K available decoupled MU-SU-MIMO (interference) channels in each cell, one per BIA code indexed by k=1, 2, . . . , K.

This viewpoint offered by the Aligned BIA Code Structure allows for very flexible user scheduling and system operation. To illustrate, consider the case shown in Table I in which all the codes are used within each cell on all bands, and all user streams are allocated equal transmit power $P_s$. This corresponds to a code-reuse 1 frequency-reuse 1 scenario.

TABLE I

CODE AND POWER ASSIGNMENTS OVER ALL BANDS USING CODE-REUSE 1

|  | | Base-station index b | | | | | | |
|---|---|---|---|---|---|---|---|---|
| | | b = 1 | b = 2 | b = 3 | b = 4 | b = 5 | ... | b = B |
| Alignment code index k | k = 1 | $P_s$ | $P_s$ | $P_s$ | $P_s$ | $P_s$ | ... | $P_s$ |
| | . | . | . | . | . | . | | |
| | . | . | . | . | . | . | ... | $P_s$ |
| | . | . | . | . | . | . | | |
| | k = K | $P_s$ | $P_s$ | $P_s$ | $P_s$ | $P_s$ | ... | $P_s$ |

Note that each row in Table I, as well as Tables II-IV, represents a power mask.

Table II describes a system that assigns a given code in a regular fashion once every two cells, with each cell using only half of the codes on each band. The power assigned to each code is the same. This corresponds to a code-reuse 2 frequency-reuse 1 case. Note that powers in Table II are doubled compared to Table I so that the average transmit power per band within each cell is the same in both cases.

TABLE II

CODE AND POWER ASSIGNMENTS OVER ALL BANDS
USING CODE REUSE 2

| Alignment code index k | Base-station index b | | | | | | |
|---|---|---|---|---|---|---|---|
| | b = 1 | b = 2 | b = 3 | b = 4 | b = 5 | ... | b = B |
| k = 1, 3, 5, ... | $2P_s$ | 0 | $2P_s$ | 0 | $2P_s$ | ... | 0 |
| k = 2, 4, 6, ... | 0 | $2P_s$ | 0 | $2P_s$ | 0 | ... | $2P_s$ |

Table III shows a conventional frequency reuse 2 system in which all the codes are used for transmission by a base station on its active bands. If users operating under Table II perform the same alignment operations with respect to all K codes, the performance of the schemes in Tables II and III are equivalent. This can be understood by noting that the interference on any given code in both systems is the same, i.e. coming from every other station with all such stations using transmission power $2P_s$ on each code.

TABLE III

FREQUENCY REUSE 2 WITH CODE-REUSE 1

| Band index f code index k | Base-station index b | | | | | | |
|---|---|---|---|---|---|---|---|
| | b = 1 | b = 2 | b = 3 | b = 4 | b = 5 | ... | b = B |
| f = 1, k = 1, 2, 3, ... (all k) | $2P_s$ | 0 | $2P_s$ | 0 | $2P_s$ | ... | 0 |
| f = 2, k = 1, 2, 3, ... (all k) | 0 | $2P_s$ | 0 | $2P_s$ | 0 | ... | $2P_s$ |

In another embodiment, the BIA scheme operates a single (M,K) BIA code, and the BIA code is aligned across BSs. In one example, illustrated in Table IV, reuse varies from one codeword to the next; e.g, code reuse 1 on BIA codewords with k=1,2; code reuse 2 on BIA codewords with k=3,4; and "fractional code reuse" on BIA codewords with k=5,6; etc. This allows for very flexible code/frequency reuse operation.

TABLE IV

Code Index Dependent Code Reuse

| Alignment code index k | Base-station index b | | | | | | |
|---|---|---|---|---|---|---|---|
| | b = 1 | b = 2 | b = 3 | b = 4 | b = 5 | ... | b = B |
| k = 1, 2 | $P_s$ | $P_s$ | $P_s$ | $P_s$ | $P_s$ | ... | $P_s$ |
| k = 3 | $2P_s$ | 0 | $2P_s$ | 0 | $2P_s$ | ... | 0 |
| k = 4 | 0 | $2P_s$ | 0 | $2P_s$ | 0 | ... | $2P_s$ |
| k = 5 | $3P_s/2$ | $P_s/2$ | $3P_s/2$ | $P_s/2$ | $3P_s/2$ | ... | $P_s/2$ |
| k = 6 | $P_s/2$ | $3P_s/2$ | $P_s/2$ | $3P_s/2$ | $P_s/2$ | ... | $3P_s/2$ |

Thus, base stations (or cluster of base stations) in the topology operate according to power masks in Tables II-IV that specify transmission power to be used by each base station on each codeword on a transmission resource associated with a BIA code, with the transmission power specified by the power mask varying as a function of base station index for each code index value and each transmission.

Operation of Aligned BIA in Cells and Clusters

Figures 2A, 2B:
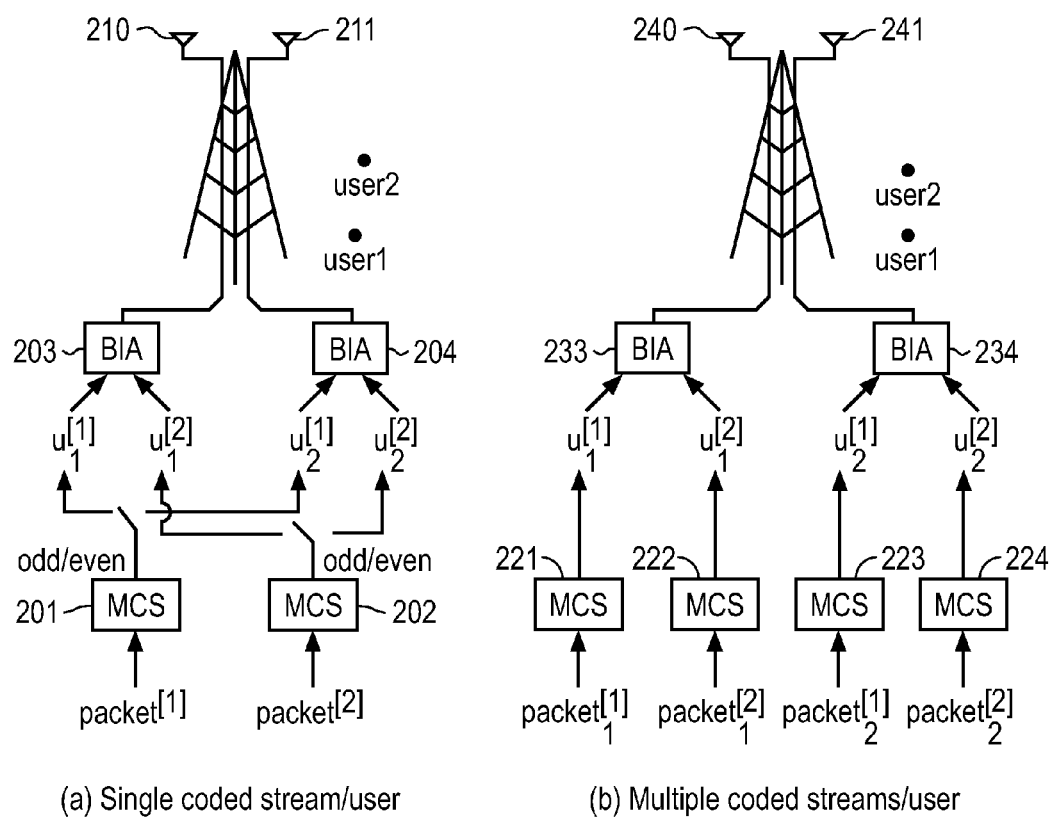
FIGS. 2A and B illustrate two deployments of cellular with $(M,K)=(2,2)$ and $N_t=2$.

BIA can be applied to cellular. FIGS. 2A and 2B illustrate two possible deployments of cellular using (M, K)=(2; 2) and code-reuse 1. Referring to FIGS. 2A and 2B, "$\text{packet}_i^{[k]}$" refers to the $i^{th}$ uncoded data packet for user k, MCS the modulation/coding scheme used, and BIA the arithmetic operations required to correctly combine coded symbols for transmission. Referring to FIG. 2A, each user ([1], [2]) has a single data packet that undergoes coding and modulation by coding and modulation (MCS) units 201 and 202, in a manner well-known in the art, to each produce a single coded stream. For each code stream, half of the coded symbols (e.g., odd symbols) are used for transmissions on one antenna 210, and the other symbols (e.g., even symbols) are used for the other antenna 211. That is, symbols from the user data stream generated by each of MCS units 201 and 202 are sent to BIA transmitters 203 and 204, respectively, which feed antennas 210 and 211, respectively.

In FIG. 2B, each user has two data-packets that undergo coding and modulation by coding and modulation units 211-214, which each produce their own coded stream. One coded stream drives one antenna, and the other coded stream the other. More specifically, $\text{packet}_1^{[1]}$ undergoes coding and modulation by MCS unit 211 to produce coded data $u_1^{[1]}$ and $\text{packet}_1^{[2]}$ undergoes coding and modulation by MCS unit 212 to produce coded data $u_1^{[2]}$. These coded streams are sent to BIA transmitter 233, which drives antenna 240. Similarly, $\text{packet}_2^{[1]}$ and $\text{packet}_2^{[2]}$ are coded and modulated by MCS units 223 and 224, respectively, to produce coded streams $u_2^{[1]}$ and $u_2^{[2]}$, respectively. These are transmitted by BIA transmitter 234 using antenna 241. In terms of ergodic rates, whereby the coded stream(s) for any user span transmissions across many channel realizations, the performance of the two systems is equivalent. Approximations to such an operation can occur in practice, for example, if coded symbols are applied to different independently fading tones in an OFDM system.

Figure 3:
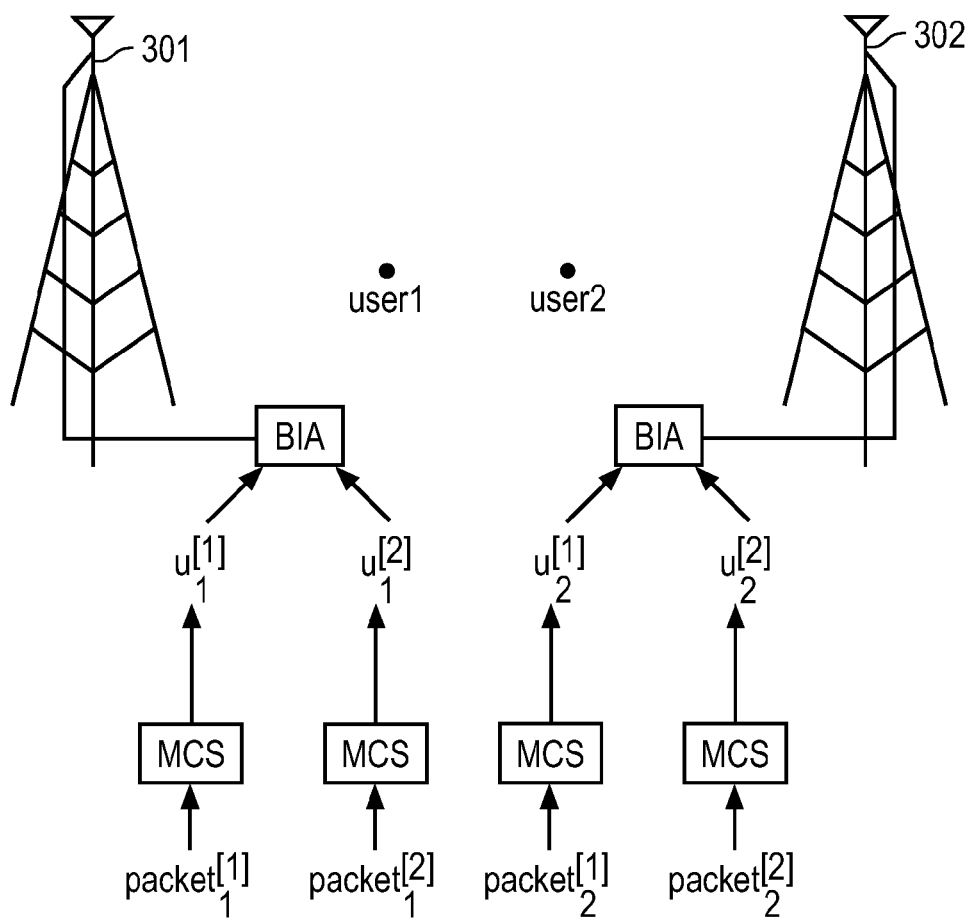
FIG. 3 illustrates a cluster with code-reuse 1, $(M,K)=(2,2)$ and $N_t=1$.

FIG. 2B has a natural extension to operations across clusters as shown in FIG. 3. Referring to FIG. 3, the arrangement is the same as FIG. 2B except the antennas of one cell are split between two cells so that each station now has a single antenna ($N_t=1$), namely antennas 301 and 302. The example illustrates one operational benefit of BIA when applied to clusters. Specifically, each station (antenna) can operate using independent data packets and independent coded streams.

Figures 4, 5:
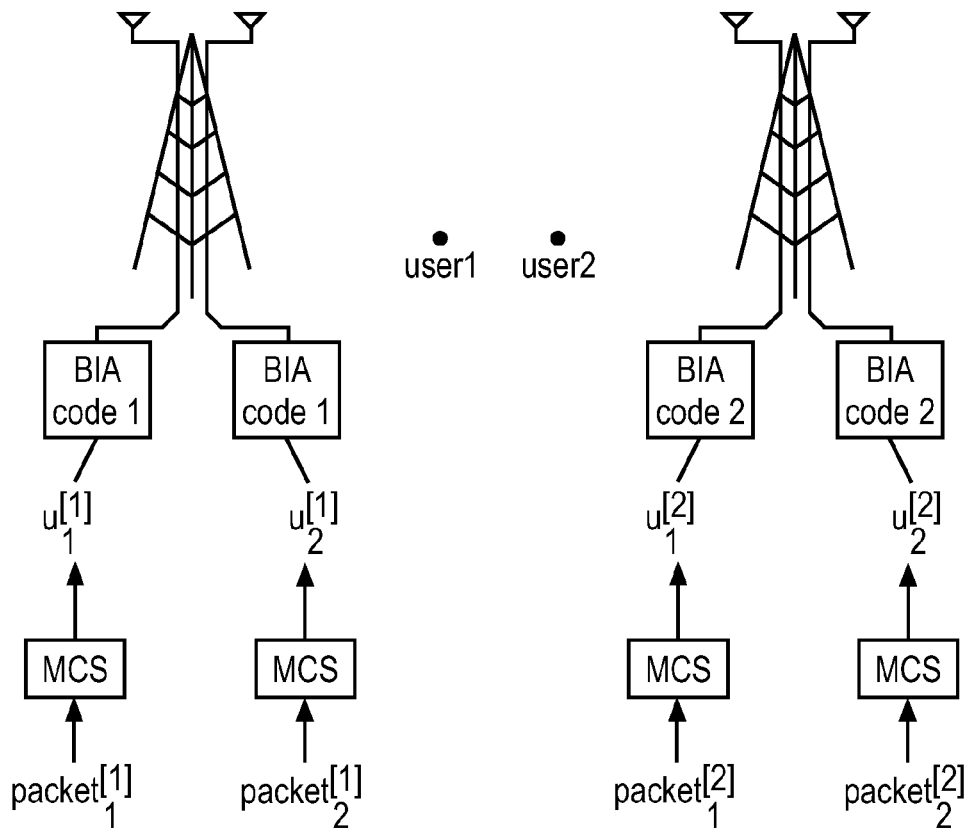
FIG. 4 illustrates cellular with code-reuse 2, $(M,K)=(2,2)$ and $N_t=2$.
FIG. 5 illustrates an example of cluster-synchronous BIA schemes with M=K=2, exploiting sub-band scheduling and power control.

One can take the case of FIG. 3, rearrange packets and BIA codes so that each station only serves one user on one code. This is a cellular scheme with code-reuse 2 with $N_t=2$ as in FIG. 4. Referring to FIG. 4, each base station has two BIA transmitters that receive coded data from separate MCS units, which perform coding and modulation on different packets of the same user.

An interesting comparison can be made between FIG. 3 and FIG. 4 for users equidistant between the two stations. For such users, assuming the same pathloss and statistically equivalent channels to each station, the performance of both systems is equivalent. However, as users move away from cluster centers and experience stronger channels to one of the two stations, exploiting this stronger channel via a cellular scheme, or by power allocations to streams, can be beneficial.

Finally, a subtle point to make concerns the number of antenna modes required by different systems. All users in all schemes of FIGS. 2A, 2B, 3 and 4 require only M=2 antenna modes. Thus, from the point of view of user hardware, such schemes are roughly comparable. However, the cluster scheme uses $N_t=1$ while cellular $N_t=2$. In order for the cluster scheme to make full use of $N_t=2$, one would have to consider more antenna modes at the user using schemes (M, K) with M=4. Thus, BIA brings in another dimension in user hardware that should be considered in addition to station hardware when comparing schemes.

Embodiments Involving BIA Schemes in Multisite Deployments

Embodiments of the invention leverage the superior performance can be obtained by optimizing: the way users are grouped/scheduled for BIA transmission within a cluster; the way parallel BIA transmission emanating from different transmitting clusters of base-stations are coordinated; that users are grouped/scheduled for parallel BIA transmissions across clusters; the way BIA codes are re-assigned to different users across clusters in the context of scheduling parallel BIA transmissions; and/or the way the power levels in the BIA codes are allocated to different users across clusters in the context of scheduling parallel BIA transmissions.

BIA-Related Architectural Options

In multi-cell deployments, multiple cells schedule parallel transmissions to subsets of their users. As is also well known (e.g., from the practice of conventional cellular architectures and conventional MU-MIMO schemes), the way these parallel transmissions are coordinated can have a large effect in the delivered per-user rates and the overall system performance. In the context of BIA schemes, embodiments of this invention focus on the case whereby whenever any given base-station (or cluster of base-stations) employs BIA to transmit to its users, all other clusters also employ BIA to transmit to their users. Embodiments of the invention include methods for operating in BIA in multisite deployments. In particular, one method considers embodiments regarding two classes:

- Cluster-synchronous BIA transmission schemes: in this case, all clusters engage in parallel BIA transmissions, all with the same M, and K values, and all with the same $\{q^{[k]}\}$ set. However the $\{p^{[k]}\}$ sets can be varied from cluster to cluster. Note that, on the set of time and frequency slots corresponding to transmitting a single alignment code (such as in the examples below), the values of M, K, and $\{q^{[k]}\}$ are the same in all clusters engaging in synchronous BIA transmission, but these parameters can be changed over time and/or frequency, from one alignment code to the next). In this case, it can be readily shown that, after interference cancellation, the user assigned the m-th BIA code in a given cluster, is only interfered by the streams transmitted to users also assigned the m-th BIA code in neighboring clusters. This is because, the blind interference removal mechanism employed by the user to remove interference from all the other (K-1) user streams in its own cluster, also removes interference from all the user streams in any other cluster except for the user stream assigned on the m-th code.
- Cluster-asynchronous transmissions schemes: in this case each cluster users its own BIA scheme with its own M, and K values. In this case, interference removal within a cluster does not result in any interference removal in neighboring clusters. As a result such schemes provide freedom in terms of letting each cluster separately optimize its BIA scheme towards the group of users it is serving. For instance the values of M and K (and thus N and L) may vary time and frequency within a given cluster independently of all other clusters. In addition the L symbols of an alignment block (or blocks of L-alignment block symbols) may be scrambled across time in a cluster specific way.

Power Allocation and User Scheduling Across Clusters in Cluster-Synchronous BIA Transmissions.

Many embodiments of the invention involve cluster-synchronous BIA transmission schemes. By properly varying the user groups served across clusters and their power parameters, improved BIA deployment schemes can arise, which outperform cluster-synchronous BIA schemes based on a common power allocation, i.e., based on a single static BIA scheme that employs a common $q^{[k]}=q$ and a common $p^{[k]}=p1_{M\times 1}$, as is the case for instance with the original scheme [1] and the constant-transmission scheme of Example 4.

In order to illustrate embodiments of the invention, the user topology is considered in small bins, and users from the i-th bin in cell b are referred to as users from bin (i,b). For convenience of exposition, it is assumed that all users in bin (i,b) are in the same location. However, the techniques presented do not need such assumptions to provide system performance benefits.

In one embodiment, all clusters assign on their m-th code (for each specific value of m) a user from the same relative location in their cell. In cellular BIA schemes, for instance, this would mean that if BS b=0 schedules on the $1^{st}$ code a user from bin (i, 0), then BS b, schedules on its $1^{st}$ code a user from location (i, b). (In practice, this may correspond to assigning the same code across cells to users with similar nominal-SINR levels). Examples of this embodiment follow below:

Example 6

Cellular Transmission with BIA Serving Groups of Same Relative-Location Users in Each Cell and Across Cells At each scheduling instant "T", BS b schedules via a $$BIA\left(M, K, \left\{p1_{M\times 1}, \frac{1}{K}\right\}_{k=1}^{K}\right)$$

scheme K users from bin (i, b), where i=i(T). In this case, MK and p can be varied with T, or i(T). Note that M can be at most as large as the minimum of $N_t$ and the number of mobile antenna modes.

Example 6.1

Figure 7:
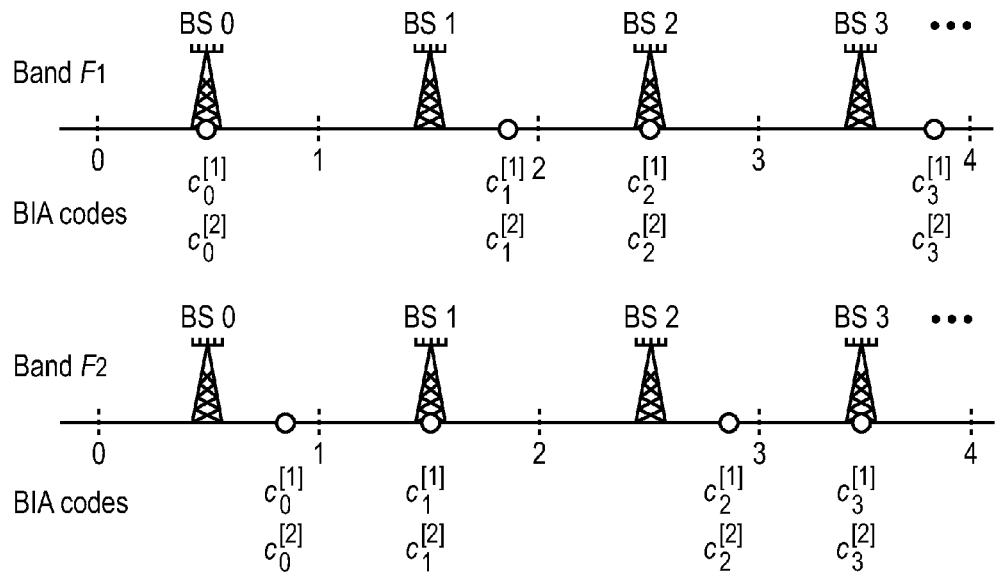
FIG. 7 illustrates a 1-dimensional illustration of cell-synchronous BIA transmission strategy with K=2. On bands that odd-indexed BSs serve cell-edge users, even-index BSs serve cell-center users.

As a quick illustration, of the schemes in Example 6, consider the special case K=2 whereby each cell serves simultaneously two users in the same location. When, e.g., cell-edge (or cell-center) users are jointly served by their transmitting cells, given an M value, each user stream (on each transmit) gets power $p=P_{slot}/M$ in block 2 and half that power in block 1. The example is shown in FIG. 7. As shown in FIG. 7, many parallel BIA schemes can be operated over distinct bands, each serving a single user set.

In one embodiment of such a system, the values of M and K are chosen/optimized individually, at each location being served (or over groups of locations being served). In one embodiment, the "relative frequency" by which users from location i are scheduled (jointly across clusters) is chosen so as to optimize a given system utility function. In one embodiment, multiple parallel BIA transmissions are multiplexed in frequency, with each band serving possibly a distinct set of users with the same M and K. In that case, the set of power levels can be chosen to optimize a system utility function, and subject to not violating a transmit-power constraint (as done for instance in example in FIG. 6).

Example 7

Cellular Transmission with BIA Serving Groups of Same Relative-Location Users in Each Cell but where the Relative Locations can Differ from Cell to Cell At each scheduling instant "T", BS b schedules, via a $$BIA\left(M, K, \left\{p_b 1_{M\times 1}, \frac{1}{K}\right\}_{k=1}^{K}\right)$$

scheme, K users from bin $(i_b, b)$, where $i_b = i_b(T)$. In this case, MK and $\{P_b\}$ can also be varied with T, or i(T). Note that M can be at most as large as the minimum of $N_t$ and the number of mobile antenna modes.

Figure 8:
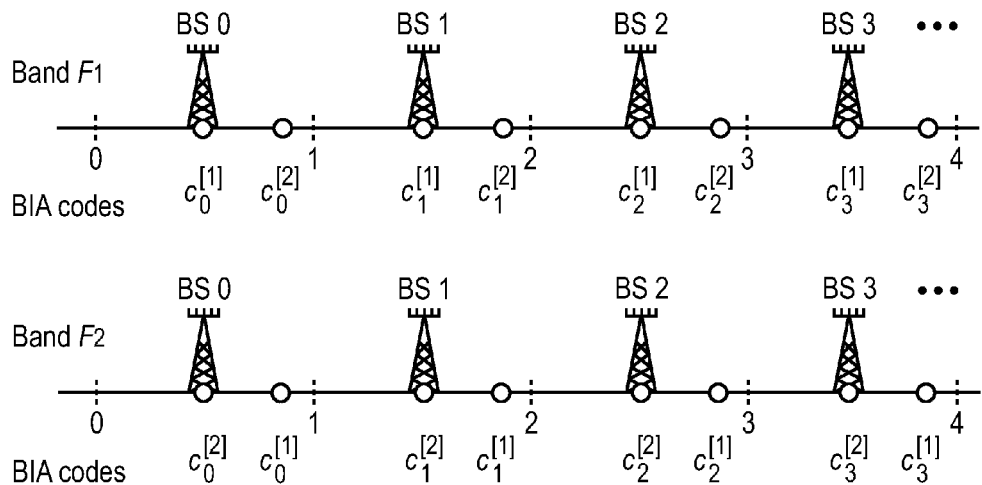
FIG. 8 illustrates a 1-dimensional illustration of cell-synchronous BIA transmission strategy with K=2.

One example of this embodiment is shown in FIG. 8 and described below.

Example 7.1

As a quick illustration in the uniform 1D topology of cells consider the special case K=2 in which each cell serves simultaneously two users in the same location. Assume that odd (even) cells serve users from the same relative location, and that when odd cells serve edge users, even cells serve center-users. In this case, cell-edge users in odd cells, served jointly with cell-center users in each even cell, all comply to the same value of M. Edge users in odd cells get power $p_1$ in block 1 and half of $p_1$ in block 2, At the same time, center users in even cells get transmitted with power $p_2$ in block 1 and half of $p_2$ in block 2. By setting $p_1 > p_2$, a setting can be obtained in which the SINR is improved and therefore the rate to the edge users at the expense of the center users rate. Such a system is an example of trading off system sum rate for system edge-rate performance.

In one embodiment of such a system, the values of M and K are chosen/optimized individually, for each pair (or group) of locations (being jointly served). In one embodiment, the "relative frequency" by which users from each pair (group) of locations are scheduled (jointly across clusters) is chosen so as to optimize a given system utility function.

Example 8

Cellular Transmission with a Common BIA Code, in which Users from Multiple Locations are being Simultaneously Served by Each BIA Scheme but where the k-Th BIA Code is Assigned to the Same Bin Location in Each Cell At each scheduling instant "T", BS b uses a BIA(M,K, $\{p^{[k]} 1_{M\times 1}, q^{[k]}\}_{k=1}^{K}$) scheme where $$\sum_{k=1}^{K} q^{[k]} = 1.$$

BS b serves on code k a user from bin $(i_k, b)$, where $i_k = i_k(T)$. In this case, M and K are fixed, but $p^{[k]}$ and/or $q^{[k]}$ can be varied with k and T, or with the relative location being served.

In one embodiment of such a scheme, a common set of M and K are chosen over time. Need to explain power optimizations here.

Figure 9:
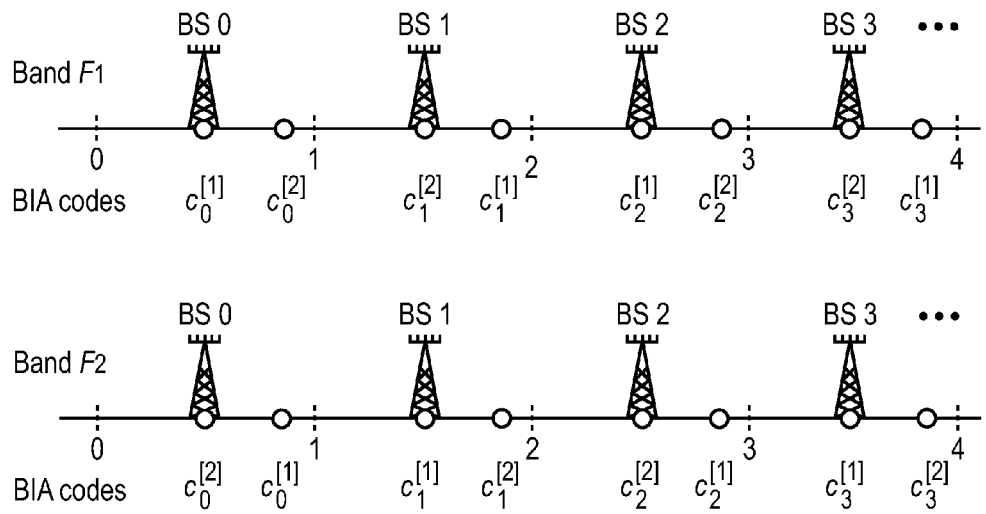
FIG. 9 illustrates a 1-dimensional illustration of cell-synchronous BIA transmission strategy with K=2.

Examples of this embodiment are shown in FIG. 9 and described below in examples 8.1 and 8.2.

Example 8.1

As a quick illustration in the uniform 1D topology of cells, consider the special case K=2 in which each cell serves simultaneously a cell-center user (with code 1) and a cell-edge user (with code 2). Assuming $p^{[1]} = p^{[2]}$, and $q^{[1]} + q^{[2]} = 1$, this is a constant transmission-power BIA scheme.

Example 8.2

Consider a variation of the above example, where $p^{[1]} < p^{[2]}$, (yielding a variable-transmission-power BIA scheme), and $q^{[1]} + q^{[2]} = 1$. By letting $q^{[2]} \to 0$, the BIA scheme allows the center users to get the maximum DoFs without noise enhancement (since $q^{[2]} \to 0$). At the same time, edge users get only a single eigenmode through, but this mode has an improved SINR.

In one set of embodiments, clusters engage in synchronous BIA transmissions, whereby the kth code in each BIA-transmitting cluster is not necessarily assigned to users in the same relative cluster locations.

Example 9

Cellular Transmission with BIA Simultaneously Serving Relative-Location Users in a Coordinated Fashion Across Cells on the Same BIA User Code At each scheduling instant "T", BS b transmits via a BIA $(M,K,\{p_b^{[k]} 1_{M\times 1}, q^{[k]}\}_{k=1}^{K})$ scheme to K users. User k is chosen from bin $(i_k(b), b)$, where $i_k(b) = i_k(b,T)$. In one embodiment, M and K are fixed and $p_b^{[k]}$ is possibly varied with T, or with the relative location being served.

An example of this embodiment is shown in FIG. 10 and described below.

Example 9.1

As a quick illustration, consider again a uniform 1D topology of cells engaging in cell-synchronous BIA transmissions with K=2, whereby each cell serves simultaneously a cell-center user and a cell-edge user. In odd (even) cells, cell-center users are given code 1 (code 2). Cell-center (cell-edge) users are given the same power in both even and cell cells that they are served, i.e., $p_{2b+1}^{[1]} = p_{2b}^{[2]} = p_{center-user}$, (and $p_{2b+1}^{[2]} = p_{2b}^{[1]} = p_{edge-user}$ in the case of cell-edge users). Setting $q^{[1]} = q^{[2]} = \frac{1}{2}$, and letting $p_{center-user} < p_{edge-user}$, gives a BIA-based cellular scheme that trade-off center with cell edge rate, much like the traditional fractional-frequency reuse scheme do in traditional cellular traditional cellular architectures.

Finally, in cluster based transmissions, it may be beneficial to skew the transmit power of streams intended for a given user so that the streams from the antennas closest to the user are provided higher power relative to the power allocated to antennas that are further.

In one embodiment, the method enables BIA cluster-synchronous transmission, by splitting the time-frequency plain in OFDM transmission into blocks of OFDM symbols over time, $B_1, B_2, \ldots$. For the transmission of the jth block $B_j$, the base-stations are split into clusters (with the clustering sets possible depending on j), and whereby the c-th cluster of BSs employs a $BIA(M_j, K_j, \{p_{j,c}^{[k]}, q_j^{[k]}\}_{k=1}^{K_j})$ scheme. In one embodiment, $M_j, K_j$, and $q_j^{[k]}$ end on the block index j but are common for all transmitting clusters in order to enable cluster-synchronous transmission where each user in each cluster is interfered by the transmission of only one out of $K_j$ users in all other clusters. In one embodiment, the $p_{j,c}^{[k]}$ vectors depend on the transmission block index j, the cluster index c and the code index k.

Figure 6:
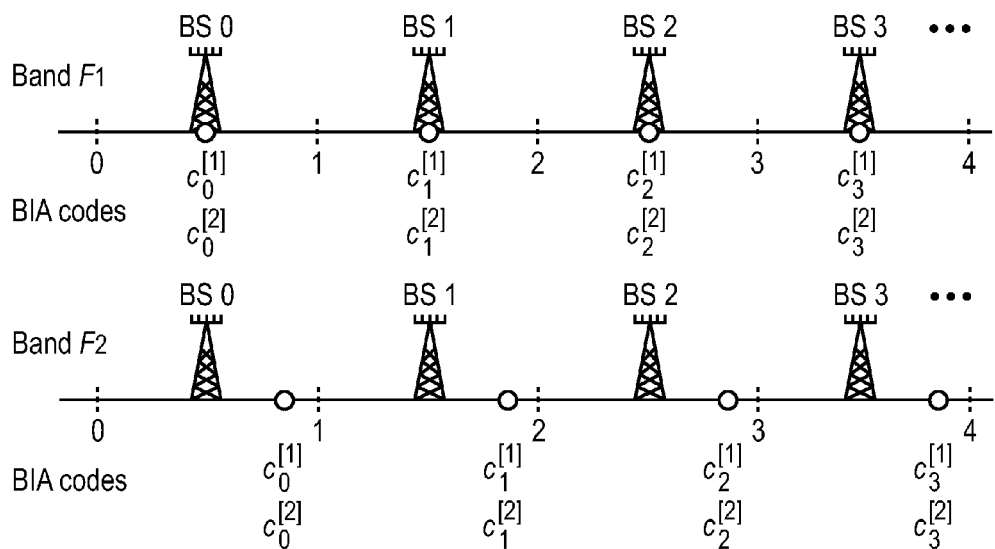
FIG. 6 illustrates a 1-dimensional illustration of cell-synchronous BIA transmission strategy with K=2. On any given band, all cells serve users from the same relative cell location.

In one embodiment, the $p_{j,c}^{[k]}$ vectors are selected a priori, and the c-th cluster of base-stations assigns a subset of its users on its $K_j$ BIA user codes, and independently of all other clusters, using information such as knowledge of the users nominal SINR levels, and/or nominal SNR levels from different BSs (within and outside the cluster), as well as knowledge of the a priori selected $p_{j,c}^{[k]}$, vectors used by one or more neighboring clusters of BSs engaging in cluster-synchronous BIA transmissions. FIG. 6 shows an example of such a scheme, involving cluster-synchronous BIA transmissions with M=K=2, exploiting sub-band scheduling and power control. In this example, the clusters are size-1, and each base-station employs two BIA schemes, one on each band (and of the form suggested in e.g., example 9.1 and FIG. 10). Assuming equal bandwidth in bands $F_1$ and $F_2$, the resulting transmission is a constant-power transmission with power per slot $(P_1+P_2)/2$. Assuming $P_1>P_2$, BS b may choose relatively low nominal-SINR users (e.g., cell-edge users) in its cell to be served either with code k=1 in band $F_1$, or with code k=2 in band $F_2$, while sufficiently high nominal-SINR users would be served with code k=2 in band $F_1$, or code k=1 in band $F_2$. The neighboring BSs with indices b+1 and b−1 would instead serve high nominal-SINR users with code m in band $F_m$, and use the remaining codes to serve low nominal-SINR users. Due to the choice $P_1>P_2$, low nominal-SINR users enjoy a rate benefit at the expense of high nominal-SINR users (much like in conventional sub-band scheduling FFR systems) in every cell, while ensuring a constant power transmission.

In one embodiment, sets of users in different cells (or clusters of cells) are jointly paired and assigned on the kth user code (for k=1, 2, . . . , $K_j$) of parallel cluster-synchronous BIA transmission emanating from their clusters, In one embodiment, the $p_{j,c}^{[k]}$ for fixed k are chosen jointly over all clusters c (or in subsets of clusters), subject to some joint performance metric across all users (or subsets of users) scheduled on the kth user code. In one embodiment, the kth code is assigned across the deployment to users with the same (or similar) nominal-SINR levels with respect to transmission from their cluster. In one embodiment, neighboring clusters of one or more transmitting BSs assign on a given user code index k, sets of users with pre-specified but possibly different nominal SINR levels (pairing, e.g., cell-center with cell-edge users) and then choose values for $p_{j,c}^{[k]}$ and potentially $q_j^{[k]}$ values to select rate trade-offs among these user pairings.

Thus, in one embodiment, each base station may schedule users on a code index and location based on geographic user location and/or large-scale SINR values.

User Populations with Different Mobility Levels

Note that in one embodiment different BIA codes address different mobility levels. For a given number of transmit antennas, the larger number of codewords in the BIA code, the larger the rates provided by the code (i.e., the larger the number of multiplexed users), but also the longer the code. Since the user channels need to stay effectively constant for the duration of the code, the more codewords used, the larger the coherence time requirements on the mobile devices. As a result, in one embodiment, the system operates several BIA codes that span several coherence times (mobility levels) and can provide a range of rate/mobility options.

Figure 11:
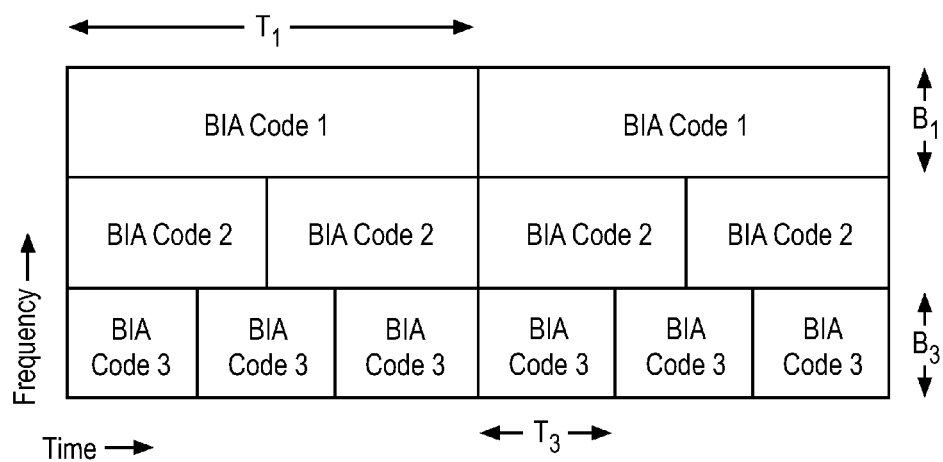
FIGS. 11 and 12 illustrate examples of codes addressing user populations with different mobility levels.
Figure 12:
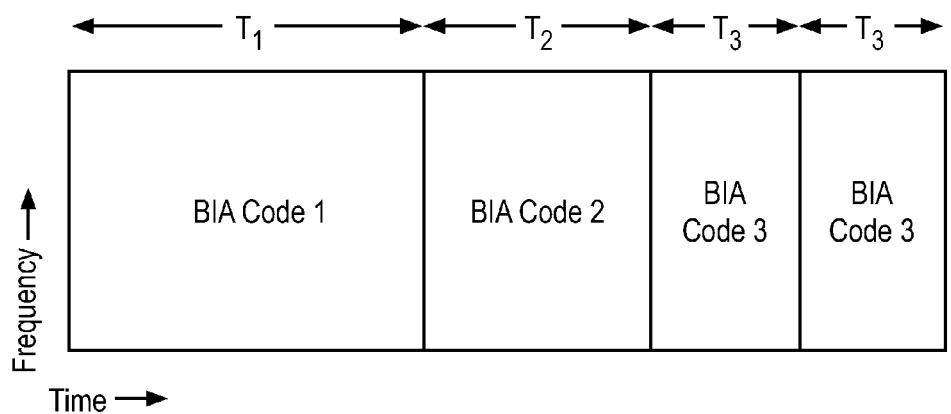

FIGS. 11 and 12 are examples that illustrate when base stations only serve a set of users having a same relative cell location across the topology using codes that vary as frequency bands vary. In such a case, different BIA codes are used to serve users of different mobility (rather than different locations). For FIG. 11, when using codes to address user populations with different mobility levels, users with coherence time $T_1$ or higher are served on band $B_1$ by BIA Code 1; users with coherence time between $T_2$ and $T_1$ are served on band $B_2$ by BIA Code 2; and users with coherence time between $T_3$ and $T_2$ are served on band $B_3$ by BIA Code 3.

Referring to FIG. 12, when using codes to address user populations with different mobility levels, users with coherence time $T_1$ or higher are served by BIA Code 1; users with coherence time between $T_2$ and $T_1$ are served by BIA Code 2; and users with coherence time between $T_3$ and $T_2$ are served by BIA Code 3.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A wireless communication system comprising:
a plurality of receivers, wherein each receiver in the plurality having a multi-mode antenna with a single radio frequency (RF) chain that is operable in a plurality of antenna modes, and further wherein each receiver shifts between the plurality of antenna modes in a predetermined manner; and
a plurality of base stations in a cell topology to perform downlink transmissions to the plurality of receivers, each base station in the plurality of base stations having one or more transmitters having a transmit antenna and being operable to communicate with one or more of receivers in the plurality of receivers using a multi-user MIMO (MU-MIMO)-based blind interference alignment (BIA) scheme, wherein each active base station in the plurality of base stations operates an identical BIA code structure in a given transmission resource.

2. The wireless communication system defined in claim 1 wherein the given transmission resource comprises a frequency band.

3. The wireless communication system defined in claim 1 wherein the given transmission resource comprises a time slot.

4. The wireless communication system defined in claim 1 wherein base stations in the topology operate according to a power mask that specifies transmission power to be used by each of the base stations on each codeword on a transmission resource associated with a BIA code.

5. The wireless communication system defined in claim 4 wherein transmission power specified by the power mask varies as a function of a base station index for each code index value and each transmission.

6. The wireless communication system defined in claim 1 wherein each base station schedules users on a code index and location based on geographic user location.

7. The wireless communication system defined in claim 1 wherein each base station schedules users on a code index and location based on user large-scale signal to interference ratio values.

8. The wireless communication system defined in claim 1 wherein the plurality of base stations comprise a first group of base stations and a second group of base stations, and further wherein a first group of codewords are active for use by the first group of base stations and a second group of codewords are active for use by the second group of base stations.

9. The wireless communication system defined in claim 1 wherein the plurality of base stations employs code reuse that varies from one codeword to a next codeword.

10. The wireless communication system defined in claim 1 wherein the plurality of base stations comprise a first group of base stations and a second group of base stations, and further wherein on a first set of bands the first group of base stations serve a first set of user terminals in a first relative location with respect to its serving base station, the second group of base stations serve a second set of user terminals in a second relative location with respect to its serving base station and on a second set of bands the first group of base stations serve the first set of user terminals in second relative location with respect to its serving base station, the second group of base stations serve the second set of user terminals in the second relative location with respect to its serving base station.

11. The wireless communication system defined in claim 1 wherein base stations serve only a set of users having a same relative cell location across the topology using codes that vary as frequency bands vary.

12. The wireless communication system defined in claim 9 wherein only one antenna is active at each receiver in the plurality of receivers during a given time slot.

13. A method for communicating in a wireless communication system having a plurality of receivers and a plurality of base stations, wherein each receiver in the plurality having a multi-mode antenna with a single radio frequency (RF) chain that is operable in a plurality of antenna modes, and further wherein each base station in the plurality of base stations has one or more transmitters having a transmit antenna and being operable to communicate with one or more of receivers in the plurality of receivers using a blind interference alignment (BIA) scheme, the method comprising:
performing downlink transmission with the plurality of base stations to transmit wireless signals to the plurality of receivers using a blind interference alignment (BIA) scheme while the plurality of receivers shift between the plurality of antenna modes in a predetermined manner, including
operating each active base station in the plurality of base stations with an identical BIA code structure in a given transmission resource.

14. The method defined in claim 13 wherein the given transmission resource comprises a frequency band.

15. The method defined in claim 13 wherein the given transmission resource comprises a time slot.

16. The method defined in claim 13 further comprising employing, by the plurality of base stations, code reuse that varies from one codeword to a next codeword.

17. The method defined in claim 13 further comprising using codes that vary as frequency bands vary when serving only a set of users having a same relative cell location across the topology.

18. The method defined in claim 13 further comprising operating base stations in the topology according to a power mask that specifies transmission power to be used by each of the base stations on each codeword on a transmission resource associated with a BIA code.

19. The method defined in claim 18 wherein transmission power specified by the power mask varies as a function of a base station index for each code index value and each transmission.

20. The method defined in claim 13 further comprising scheduling, by each base station, users on a code index and location based on geographic user location.

21. The method defined in claim 13 further comprising scheduling, by each base station, users on a code index and location based on user large scale signal to interference ratio values.

22. A wireless communication system comprising:
a plurality of receivers, wherein each receiver in the plurality having a multi-mode antenna with a single radio frequency (RF) chain that is operable in a plurality of antenna modes, and further wherein each receiver shifts between the plurality of antenna modes in a predetermined manner; and
a plurality of base stations in a cell topology to perform downlink transmissions to the plurality of receivers, each base station in the plurality of base stations having one or more transmitters having a transmit antenna and being operable to communicate with one or more of receivers in the plurality of receivers using a multi-user MIMO (MU-MIMO)-based blind interference alignment (BIA) scheme, wherein each active cluster of base stations in a plurality of clusters of base stations operates an identical BIA code structure in a given transmission resource.

23. The wireless communication system defined in claim 22 wherein the plurality of clusters of base stations employs code reuse that varies from one codeword to a next codeword.

24. The wireless communication system defined in claim 22 wherein clusters of base stations serve only a set of users having a same relative cell location across the topology using codes that varies as frequency bands vary.

* * * * *